United States Patent
Dias et al.

(10) Patent No.: US 10,839,042 B1
(45) Date of Patent: Nov. 17, 2020

(54) SUMMARIZING AND QUERYING DATA GENERATED FROM MULTIPLE SCENARIOS OF A DATA-INTENSIVE SIMULATION

(71) Applicant: EMC IP Holding Company LLC, Hopkinton, MA (US)

(72) Inventors: Jonas F. Dias, Rio de Janeiro (BR); Jaumir Valença da Silveira Junior, Rio de Janeiro (BR); Vinicius Michel Gottin, Rio de Janeiro (BR); Angelo E. M. Ciarlini, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 534 days.

(21) Appl. No.: 15/189,294

(22) Filed: Jun. 22, 2016

(51) Int. Cl.
*G06F 17/18* (2006.01)
*G06F 16/242* (2019.01)
*G06F 16/2458* (2019.01)

(52) U.S. Cl.
CPC ............ *G06F 17/18* (2013.01); *G06F 16/244* (2019.01); *G06F 16/2465* (2019.01)

(58) Field of Classification Search
CPC .............. G06F 17/18; G06F 17/30412; G06F 17/30539
See application file for complete search history.

(56) References Cited

U.S. PATENT DOCUMENTS

| | | | | |
|---|---|---|---|---|
| 5,850,560 | A * | 12/1998 | Kang | ......................... G06F 1/32 713/324 |
| 5,918,232 | A * | 6/1999 | Pouschine | ......... G06F 17/30592 |
| 6,446,059 | B1 * | 9/2002 | Berger | .................. G06F 16/283 |

(Continued)

OTHER PUBLICATIONS

Wikipedia "Contingency Table" <https://en.wikipedia.org/wiki/Contingency_table> accessed Sep. 28, 2018 (Year: 2018).*

(Continued)

*Primary Examiner* — Jay Hann
(74) *Attorney, Agent, or Firm* — Ryan, Mason & Lewis, LLP

(57) ABSTRACT

Simulation data is summarized and queried. A user provides an indication of simulation data that will be subsequently queried. The queried simulation data comprises (i) a set of key attributes, (ii) a set of events, and/or (iii) a set of causality relationships between a plurality of the events. First level summaries summarize simulation executions of scenarios of a combinatorial process and comprise (i) a summary of the frequency distribution of key attribute values, (ii) a timestamp for each event, and (iii) an indication of causality between events observed during the simulation. Second level summaries summarize executions of the given scenario and comprise (i) a consolidated distribution probability for the key attributes, (ii) a frequency distribution of occurrences of the events in a single execution, and (iii) a frequency of observations of the causality between pairs of events. In response to a query, second level summaries of selected scenarios are accessed to retrieve information related to the elements expressed in the query and to produce a third level summary that aggregates information accessed from the second level summaries of the selected scenarios.

20 Claims, 6 Drawing Sheets

(56) References Cited

U.S. PATENT DOCUMENTS

| | | | | |
|---|---|---|---|---|
| 6,480,842 | B1* | 11/2002 | Agassi | G06F 17/30398 |
| 7,219,034 | B2* | 5/2007 | McGee | G06F 11/323 |
| | | | | 348/672 |
| 8,271,369 | B2* | 9/2012 | Gilmore | G06Q 10/06 |
| | | | | 705/35 |
| 9,563,725 | B2* | 2/2017 | Joshi | G06F 17/5009 |
| 2008/0270363 | A1* | 10/2008 | Hunt | G06F 17/30536 |
| 2009/0018996 | A1* | 1/2009 | Hunt | G06Q 30/02 |

OTHER PUBLICATIONS

Christensson, Per. "Query Definition" TechTerms. Sharpened Productions (2011) accessible from <https://techterms.com/definition/query> (Year: 2011).*

Babcock, B., et al. "Load Shedding for Aggregation Queries over Data Streams" IEEE Proceedings of 20th Int'l Conf. on Data Engineering, ICDE'04 (2004) (Year: 2004).*

Kleinberg, Samantha, "A logic for causal inference in time series with discrete and continuous variables," IJCAI Proceedings—International Joint Conference on Artificial Intelligence. vol. 22. No. 1 (2011).

* cited by examiner

SUMMARIZING AND QUERYING DATA GENERATED FROM MULTIPLE SCENARIOS OF A DATA-INTENSIVE SIMULATION

FIELD

The field relates generally to simulation of combinatorial processes, such as logistics processes, and more particularly, to techniques for summarizing and querying data related to such simulations.

BACKGROUND

Software applications for simulations of complex systems in discrete time are often memory and storage intensive, leading to computational constraints that may render thorough simulations infeasible. Not only does this kind of software generate a large amount of data, but the problem of extracting meaningful information from massive quantities of data in a reasonable amount of time can be daunting.

Simulation applications are often used in order to study complex systems, where a large number of parameters inherent to these systems needs to be considered. Each combination of parameters corresponds to a scenario that typically need to be simulated multiple times due to the non-determinism of various parts of the system. Simulations are generated to answer several possible hypotheses, considering subsets of the simulated scenarios. Computations of simulation results for specific scenarios often generate large amounts of data to be stored and take a long time. Moreover, this large volume of data needs to be consolidated or composed in meaningful views, so as to enable domain experts to query the data and derive conclusions. In addition, obtaining query results in a timely manner can be impractical if these computations are triggered only when the queries are executed.

A need therefore exists for improved techniques for dealing with this large amount of data, and for reducing query response times.

SUMMARY

Illustrative embodiments of the present invention provide methods and apparatus for summarizing and querying data generated by data-intensive simulations. In one exemplary embodiment, a method comprises the steps of obtaining a first level summary for each execution of a simulation of a plurality of scenarios of a combinatorial process, wherein each of the plurality of scenarios corresponds to a distinct combination of exploration attributes, wherein the simulation comprises a combination of the exploration attributes comprising a plurality of independent variables that are varied during the simulation and key attributes of the combinatorial process that are a target of the simulation, and wherein a user has provided an indication of simulation data that will be queried following the simulation, wherein the simulation data that will be queried comprises one or more of (i) a set of the key attributes, (ii) a set of events, and (iii) a set of causality relationships between a plurality of the events, wherein each of the first level summaries comprise one or more of (i) a summary of the key attributes indicating a frequency distribution of each attribute value in the one or more of the key attributes, (ii) a timestamp of occurrences of each of the events, and (iii) an indication of whether the causality between the plurality of the events is observed during the simulation; obtaining a second level summary for each of the scenarios, wherein each of the second level summaries summarizes one or more executions of the given scenario and comprises one or more of (i) a consolidated distribution probability for each of the key attributes, (ii) a frequency distribution of occurrences of each of the events in a single execution, and (iii) a frequency of observations of the causality between each pair of the events; and in response to a user query that includes one or more ranges of exploration attributes that restrict the user query to a specific set of selected scenarios to be considered and one or more of (i) the key attributes, (ii) the events, and (iii) the causality between a plurality of the events, performing the following steps: (a) interpreting the user query; (b) accessing second level summaries of the selected scenarios to retrieve the information related to the key attributes, events and causality expressed in the query; (c) producing as output a third level summary that aggregates the information accessed from the second level summaries of the selected scenarios and contains one or more of (i) probability distribution functions of the key attributes, (ii) probability distribution functions of the number of occurrences of the events, and (iii) composed probabilities of the causality relationships between the events.

In one or more embodiments, the first level summary and the second level summary are generated during the simulation and wherein the second level summaries are subsequently used to generate the third level summaries in response to one or more of the user queries.

In at least one embodiment, the simulation data that will be queried further comprises one or more hierarchies of one or more aggregation attributes that group one or more of the key attributes at all summarization levels. The step of interpreting the user query optionally further comprises extracting one or more of (i) desired key attributes, (ii) a subset of valid values or intervals for each of the exploration attributes, and (iii) a subset of valid values or intervals for each of the aggregation attributes as defined by the user query. The accessing of the second level summaries of the selected scenarios to retrieve the information can be based on the valid values or intervals.

In an exemplary parallel implementation, the simulation occurs in parallel among one or more compute nodes on a distributed computing infrastructure, and each of the first level summary, the second level summary and the third level summary are generated in parallel among one or more compute nodes of the distributed computing infrastructure. In addition, the first level summaries and second level summaries are optionally computed using volatile in-memory storage and are subsequently persisted in non-volatile disk storage for future use.

Advantageously, illustrative embodiments of the invention provide improved techniques for summarizing and querying data-intensive simulation data. These and other features and advantages of the present invention will become more readily apparent from the accompanying drawings and the following detailed description.

DETAILED DESCRIPTION

Figure 1:
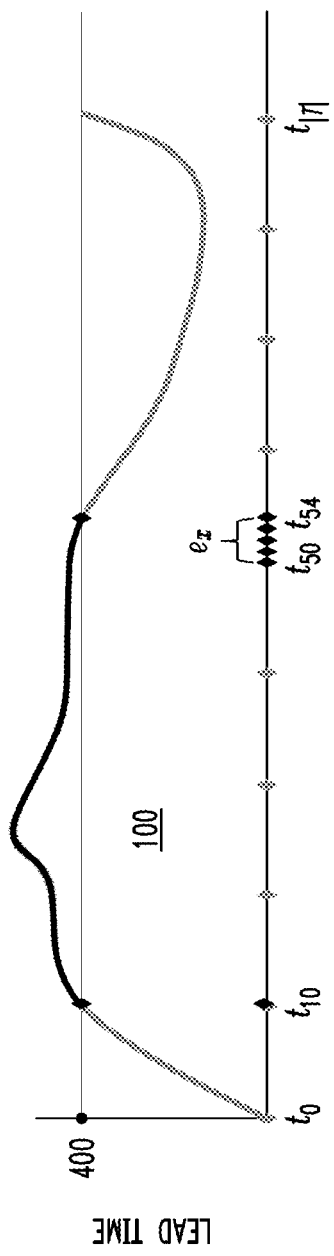
FIG. 1 illustrates occurrences of an exemplary event in time.

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for summarizing and querying data generated by data-intensive simulations. In one or more embodiments, multiple possible interesting scenarios are simulated ahead of time and the results are stored. Only the results that are relevant for each query are evaluated. This approach addresses the need of responsiveness for decision making avoiding the need to read and analyze, at query execution time, the large amount of data generated by simulation. Thus, one or more embodiments create summaries for each scenario ahead of time, and these summaries are combined on demand, without loss of data accuracy, to respond to future queries. One or more aspects of the invention recognize that the queries to be executed will determine which data, among all data generated by the simulations, will be summarized and stored.

While aspects of the present invention are illustrated in the context of an exemplary supply chain logistics simulation application in the oil and gas industry, the present invention applies in any context where large amounts of simulation data must be collected and subsequently processed to respond to user queries, as would be apparent to a person of ordinary skill in the art.

One or more aspects of the invention recognize that, from a performance viewpoint, central processing unit (CPU) access is considerably faster than disk write speed, which reflects on overall economic models for software utilization. In other words, running a simulation project and storing all its generated data so it can be used in any possible future query can be very expensive. Alternatively, storing only the summaries, i.e., a small subset of all generated data, sufficient to respond to foreseeable queries, can often be cheaper and faster.

In one or more embodiments, an application user defines which key features and events should be monitored and summarized during the execution of the simulation. In addition, users can specify causality relationships among events that are of interest for later analysis. Based on these definitions, simulation data are filtered, grouped, stored and indexed in order to quickly answer queries related to probabilities that take into account only selected subsets of the simulated scenarios.

Software applications for simulations in discrete time are widely used to help business analysts or scientists analyze and predict complex phenomena or behaviors. Typically, understanding and analyzing a specific domain problem requires that these applications be executed many times, sometimes thousands or millions of times, according to various scenarios, which are combinations of business domain input parameters determined by the domain analysts. As a consequence, a large amount of data can be generated by successive simulations during a single project, and often this generated data is too much for the available storage space allocated for a project. Moreover, this large volume of data needs to be consolidated or composed in meaningful views, so as to enable domain experts to query the data and derive conclusions. Additionally, response times need to be short enough in order not to impact the ability to quickly make decisions. Therefore, ways of dealing with this large amount of data need to be created, in order to deal with constraints of both storage and query response times.

U.S. patent application Ser. No. 14/663,630, filed Mar. 20, 2015, entitled "Methods and Apparatus for Evaluation of Combinatorial Processes Using Simulation and Multiple Parallel Statistical Analyses of Real Data," incorporated by reference herein, describes a framework for the integration of large-scale simulation and Big Data analytics. In this framework, simulation models are created based on domain knowledge about the various phases of the process to be addressed. In addition, Big Data analytics on real world data is applied to embed within the simulation model the observed variability of the different phases in different scenarios. When the model is complete, multiple simulations are executed to generate a population that can be used to predict what can happen in the different scenarios. In order to provide a mechanism for quickly answering queries related to selected scenarios, Big Data analytics is applied again to create global prediction models that can substantially instantaneously provide answers to complex queries such as distribution probabilities of key features, probabilities of events and probabilities of causality between events. In one or more embodiments, the present invention provides a summarization method that corresponds to this application of Big Data analytics.

In one or more embodiments, the techniques disclosed herein address challenges related to: (i) the reduction of required storage, (ii) the efficient creation of summaries, (iii) the efficient and substantially accurate execution of queries, and (iv) the computation of answers related to the probability of events and the causality between events, each discussed hereinafter.

Reduction of Storage

Running a simulation application under several different scenarios and conditions generates large quantities of data. An efficient way to store data is therefore highly desired; more specifically, a way to substantially permanently store only the desirable subsets of the whole data, conveniently summarized and structured to be stored for further queries and analyses.

Efficient Creation of Summaries

In one or more embodiments, the disclosed exemplary summarization process takes place in a timely fashion and does not penalize the simulation process as a whole. It is desirable that the summarization occurs substantially in parallel with the simulation itself, but without creating bottlenecks. As simulation is executed in multiple computation nodes, it is desirable to reduce the communication between simulation and summarization nodes as much as possible. In addition, summarization should be computed avoiding undesirable I/O (input/output), with minimal disk storage of partial results.

Execution of Queries

The queries to be executed are related to subsets of the simulated scenarios. It is then desirable to provide flexibility so that summaries can be accurately composed as if their original results were still available. In addition, it should be possible to compose multiple scenarios where the number of executions of each scenario can vary due to different levels of uncertainty.

Query computation efficiency is an important feature of a decision making tool. In order to reduce the amount of data to be read from disk, it is desirable to group and index summaries, by taking into account the possible queries that can be executed.

Scalability is also important as a single query might be related to thousands of scenarios. Even in this case, the response time for the query should be minimal Probability of Events and Causality Discrete-time simulation software often simulates complex processes in order to identify behavioral patterns. Identifying behavioral patterns often means finding the likelihood of the occurrence of critical events in specific scenarios. In addition, it is usually important for decision making to identify whether the occurrence of one given event during the simulation leads to the occurrence of another event; i.e., if causality exists between two specific events. A means of querying events and their causality probability in the simulation data is therefore important in one or more embodiments.

Summarizing and Querying Data-Intensive Simulation Data

Simulations enable the study of processes that are typically either rare or impractical to study in real-life. Such studies consist of running various experiments and exploring a typically large universe of input parameters, so that researchers can analyze their outcome over time. However, in some environments, the generated output data may often reach unpractical scale. In this case, storage constraints become a potential challenge for running multiple simulation experiments. Moreover, generating big volumes of data without efficient ways of querying them so as to obtain fast results is of no use.

One or more embodiments of the invention provide a summarization strategy over simulation data, taking into account future probability queries that might consider any subset of the simulated scenarios. This summarization allows for fast query execution as well as for efficient storage usage. Assume that each simulation execution generates X megabytes of data; thus, a single scenario with n executions has n×X megabytes of data to be read. If the results are summarized into a single file per scenario with Y megabytes and Y<<X→Y=1/pX (where p is an arbitrary fraction of X, meant to highlight the fact that the necessary storage is reduced by a factor of n*p, and not just n), each query will read only 1/pX megabytes instead of n×X megabytes.

To accomplish both goals—queries with short response times and efficient use of storage—a simulation Domain Expert defines ahead of time (i.e., prior to the simulation run), how the simulation data will be used on subsequent queries, as explained below. It is important to stress that these definitions establish what kind of information should be preserved and structured to answer a large amount of possible queries. In this way, all these queries can be answered almost instantaneously without the need for further computation of simulations.

Central to the idea of defining ahead of time what data will be persisted after the simulation is run, as well as how this data should be stored, are the concepts of summarization attributes, and events and causality, each discussed hereinafter.

Summarization Attributes

Summarization Attributes comprise all parameters that are important to the user and will take part in the summarization process. In one or more embodiments, the summarization attributes comprise the following:

Exploration Attributes (X)—The set of independent variables, i.e., the input parameters that are varied over their respective allowed ranges (usually a discrete domain) and will define different scenarios.

Key Attributes (K)—The set of dependent variables, i.e., attributes that are the target for analysis (e.g., attributes to be monitored). As used herein, a "set" may comprise zero or more elements. Those attributes are of two kinds:

Key element attributes, representing the attributes of the elements processed by the simulation: for each key element attribute, histograms are generated during the summarization process according to the possible Aggregation Attributes (as discussed further below in conjunction with FIG. 3) in order to evaluate the frequency of occurrences of each attribute value in the processed elements, based on scenarios previously defined by Exploration Attributes;

Key temporal attributes, representing properties assigned to a time instant of the simulated horizon: for each key temporal attribute, a histogram is generated during the summarization process, in order to count the number of time units that each attribute value assumed during the simulation, based on scenarios previously defined by Exploration Attributes.

Aggregation Attributes (A)—Optional parameters that are used to group key attributes and exhibit aggregated values.

As an example of summarization attributes, consider a supply chain logistics simulation application. The domain expert may want to analyze how the time to deliver supply orders (lead time) varies according to different combinations of fleet size and ship capacity. The expert might also want to know how port occupation with respect to docked ships changes over time. In this case, the Exploration Attributes would be fleet_size and ship_capacity while lead_time would be a key element attribute and port_occupation would be a key temporal attribute. Additionally, the domain expert may want to analyze lead time results grouped by destination. In this case, destination is an Aggregation Attribute.

Events and Causality

In addition to querying for attributes and their aggregations, the domain expert may also want to record events that occurred in the simulation and identify causality between events. In order to do so, the domain expert also needs to predefine which events to observe and which causality relations between those events are of interest.

An event is defined by the Domain Expert as a label and a computation formula. This computation formula can be arbitrarily complex. In one or more embodiments of the invention, the computation formula shall comprise a logical expression combining key temporal attributes. Consider the set of key temporal attributes $K=\{k_1, k_2, \ldots, k_n\}$. An event can be defined as the following logical expression to be checked at substantially every simulation instant t in a simulation execution T:

$$\bigwedge_{j}^{j \in K} \bigwedge_{i=0}^{\delta} (k_j^{t-i} \varphi V_j) \bigg| \varphi \in \{=, <, >, \leq, \geq, \neq\},$$

$$V_j \in dom(k_j) \forall\ j \in K$$

where $k_j^t$ is the value of the key temporal attribute $k_j \in K$ measured at instant t; $\delta$ is the substantially minimum time interval for the observation of the event; and operation $\varphi$ establishes a logical relationship between $k_j$ and an arbitrary value V which is a possible value within the domain $dom(k_j)$ of the key attribute.

The aforementioned logical expression is a conjunction of logical expressions between key temporal attributes (at different time instants) and threshold values. For instance, if the simulation experiment has the average lead time (avg_lead_time) in the last 24 h as a key temporal attribute, it is possible to use 'avg_lead_time>400' as an event. If it is desirable to check whether the average lead time remained higher than 400 for a specific period of time, it is possible to use a more complex formula such as $\Lambda_{i=0}^{40}$ lead time$^{t-i}$>400 that will evaluate to true only at periods when the lead time stayed above the 400 limit for at least 40 instants. An algorithm that detects an event only once during a contiguous window could be desirable, depending on the context.

FIG. 1 illustrates occurrences of an exemplary event in time. As shown in FIG. 1, an event $e_x$ is observed in time instants 50 through 54, inclusive. More complex formulas defining the exemplary event could also include different key attributes and different logical relationships for the same key temporal attribute.

In addition to identifying events, users may also want to know the probability that one specific event would cause another one. The Domain Expert can define which pairs of events are of interest. Given a set of all possible events $E=\{e_1, e_2, \ldots, e_n\}$, the system can evaluate the causality $C(e_i,e_j)$ between every pair of events $(e_i,e_j)$, in a simulation execution T if, for every instant t in the execution, the occurrences of $e_1$ and $e_j$ are known to be either true or false. For a discussion of suitable techniques for computing causality between events and the inference of causal relationships in time series data, see, for example, Samantha Kleinberg, "A Logic for Causal Inference in Time Series With Discrete and Continuous Variables," IJCAI Proc. Int'l Joint Conf. on Artificial Intelligence, Vol. 22. No. 1 (2011), incorporated by reference herein in its entirety.

Figure 2:
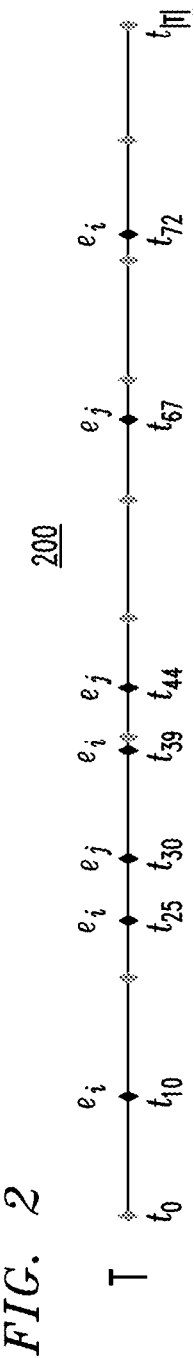
FIG. 2 illustrates a simulation execution and the times in which two simulated events occur.

FIG. 2 illustrates a simulation execution and the times in which events $e_i$ and $e_j$ occur (e.g., events $e_i$ and $e_j$ are true). In the example of FIG. 2, the lists of times when events $e_i$ and $e_j$ occur are the following:

$e_i=\{10, 25, 39, 72\}$
$e_j=\{30, 44, 67\}$

In FIG. 2, the computation of causality $C(e_i,e_j)$ on simulation execution T returns a value that can be either true or false, meaning, respectively, that T supports or does not support the hypothesis that $e_i$ is a cause of $e_j$. Furthermore, a false value is distinguished from an absence of a value (the latter meaning that simulation execution T does not indicate whether or not $e_i$ causes $e_j$). This is the case when no instances of $e_i$ happen before $e_j$ in simulation execution T.

If event $e_i$ in fact happens before event $e_j$ in simulation execution T, then event $e_i$ is considered as a prima facie cause of event $e_1$ in the case that event $e_j$ is more likely to happen following event $e_i$ than on its own. Then, a significance of event $e_i$ as a cause of event $e_j$ is computed in comparison to every other possible cause of event $e_j$ in simulation execution T. If this significance is greater than a threshold value, $C(e_i,e_j)$ yields a true value; otherwise it yields a false value.

It is noted that, in one or more exemplary embodiments, all of these conditions are formulated in a temporal logic formalism (called probabilistic computation tree logic) in which time window constraints are made explicit. Therefore, given a time window w, when checking for "$e_i$ before $e_j$", it is determined whether instances of $e_j$ occur at-most w instants after $e_i$ in T.

Multi-Level Summarization

The set of Exploration Attributes $X=\{x_1, x_2, \ldots, x_n\}$ is the list of independent variables to be explored in the simulation. Each variable $x_i \in X$ represents a set of discrete values to be explored by the simulation application. The set of possible values for $x_i$ is referred to as $dom(x_i)$ or the domain of $x_i$. A scenario is defined as an execution instance that receives as input a distinct combination of input values for each $x_i \in X$. Thus, the set of all possible combinations of input parameters is the Cartesian product $S=dom(x_1) \times dom(x_2) \times \ldots \times dom(x_n)$.

Summarization First Level:

Generally, the exemplary first level summary provides a summary for each execution of each scenario. For each scenario, $s_i \in S$, several executions of the simulation are performed. Each scenario is comprised of a unique combination of Exploration Attributes. Given the fact that most available simulation applications are non-deterministic or pseudo-random, different executions in the same scenario can lead to different outputs. In this way, it is often desirable to simulate each scenario a number of times until the inherent variability of the scenario is captured.

Figure 3:
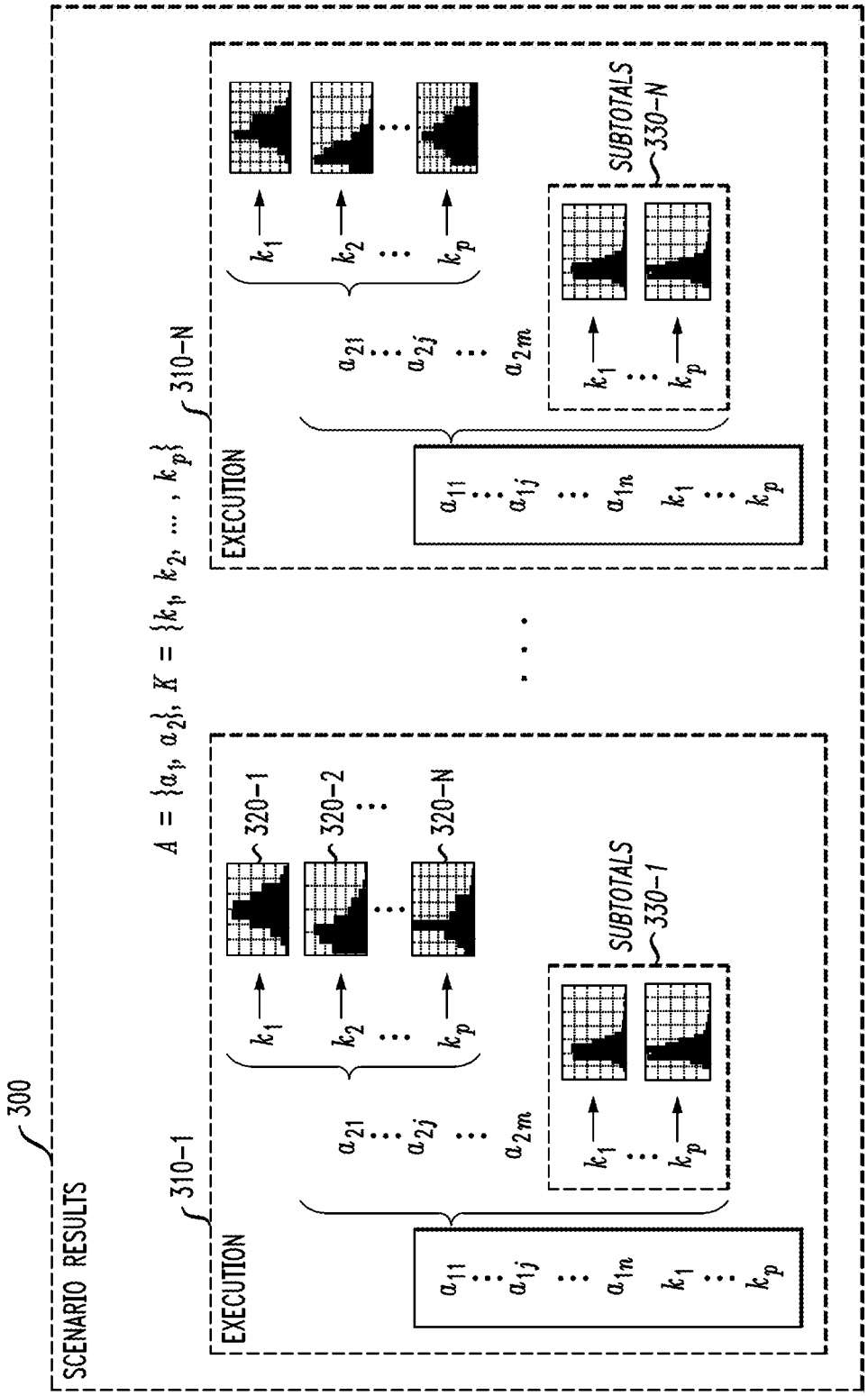
FIG. 3 illustrates an exemplary first level summarization in accordance with one embodiment of the invention for each execution a given scenario.

FIG. 3 illustrates an exemplary first level summarization 300 in accordance with one embodiment of the invention for each execution 310-1 through 310-N of a given scenario. Generally, the exemplary first level summarization 300 measures how the results vary for each execution 310 of the given scenario. For each simulation execution 310 of a specific scenario (e.g., a subset of Exploration Attributes values), the key attributes ($k_1$ to $k_p$) in K to be monitored are summarized by means of histograms 320-1 through 320-N, as shown in FIG. 3. In the example of FIG. 3, there are p distinct key attributes (k).

The exemplary first level summarization 300 is conceptually a hierarchical key-value store where each key is the combination of the values of the aggregation attributes (a) in A, plus a key attribute. As an example, in FIG. 3, the key for the first histogram 320-1 would be $(a_{11}, a_{21}, k_1)$, where $a_{11}$ and $a_{21}$ are, respectively, values in the domains of Aggregation Attributes $a_1$ and $a_2$. The number of histogram bins (ranges of values to consider for aggregation) can also be defined by the Domain Expert.

It is noted that increasing the number of aggregation attributes (the size of the set A) in the summary structure might negatively affect the query response time. This is due to the fact that the more that the summary results are split into groups, the more computational effort is needed in order to reconstruct different views (notice that in the figure above n is the number of possible values for the aggregation attribute $a_1$ while m is the number of possible values for $a_2$).

Subtotal histograms 330-1 through 330-N are optionally also calculated for each execution 310 and stored for each aggregation attribute (a) to improve query response time. The subtotals 330 are also indexed by the key attributes (k). For instance, if it is desirable to access $k_1$ aggregating only by $a_1$ (independent of $a_2$), the key for key attribute $k_1$ in the first histogram 330-1 would be $(a_n,k_1)$.

Both key element and key temporal attributes can be aggregated via aggregation attributes (a) in A as just described and computed histograms for key attributes can be transformed into distribution probabilities by taking into consideration the total number of occurrences. In the case of key temporal attributes, the number of occurrences corresponds to the number of instants of the simulation horizon. In the case of key element attributes, the number of occurrences corresponds to the number of processed elements.

Figure 4:
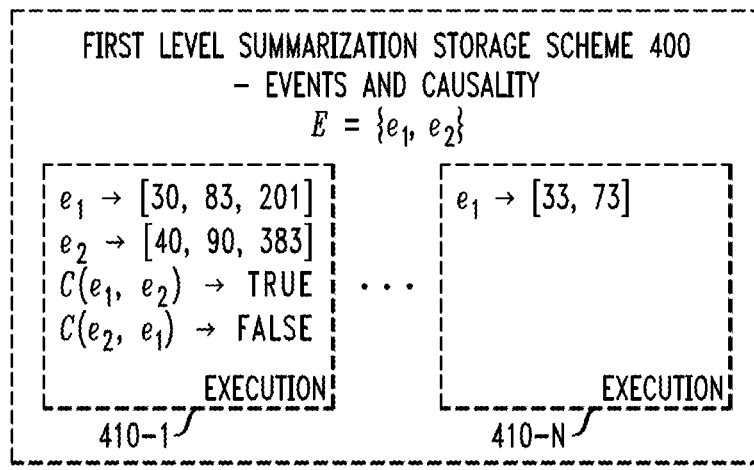
FIG. 4 illustrates an exemplary scheme for storing events and causality in the exemplary first summarization level of FIG. 3 for each exemplary execution.

FIG. 4 illustrates an exemplary scheme 400 for storing events and causality in the exemplary first summarization level 300 of FIG. 3 for each exemplary execution 410-1 through 410-N. In the exemplary first summarization level 400, the information that is saved in one or more embodiments to answer queries about events and causality corresponds to the following annotations:

For events—a list of timestamps of occurrences of each event; and

For causality—a Boolean value indicating whether the specific causality is verified or not in the execution, according to a causality metric specified by the Domain Expert (see, for example, Samantha Kleinberg, "A Logic for Causal Inference in Time Series With Discrete and Continuous Variables," IJCAI Proc. Int'l Joint Conf. on Artificial Intelligence, Vol. 22. No. 1 (2011), incorporated by reference herein).

In one or more embodiments, a True value is stored whenever, according to the metric, there is evidence of causality between the two events, and a False value is stored whenever there is evidence of not having causality between the two events. However, if the metric is not able to determine with confidence whether the causality existed or not, no causality value is stored. This is the case in the example of FIG., where in Execution 410-N, no cases of $e_2$ are observed and, therefore, no causality information $C(e_1, e_2)$ or $C(e_2,e_1)$ between $e_1$ and $e_2$ is stored.

Summarization Second Level:

As the first level runs summarization 300 runs for each execution within a scenario, all results can be reduced by aggregation to a single summary for the complete scenario. For instance, if 100 executions are run for 10 scenarios, the final summarization will consist of 10 data sets, one per scenario.

In one or more embodiments, this reduction by aggregation is made for each scenario on a reduce-by-key fashion, described as follows:

For each key in the summary, the histograms of the various simulation executions are combined to generate consolidated distribution probabilities. When there are many simulation executions, a distribution is generated for each execution and the distributions are combined, assuming an equal probability. When there are few simulation executions, however, an execution with outliers can lead to a bias. In order to avoid the bias, all occurrences can be combined in a single histogram, reducing the weight of outliers, and then generating a probability distribution.

Figure 5:
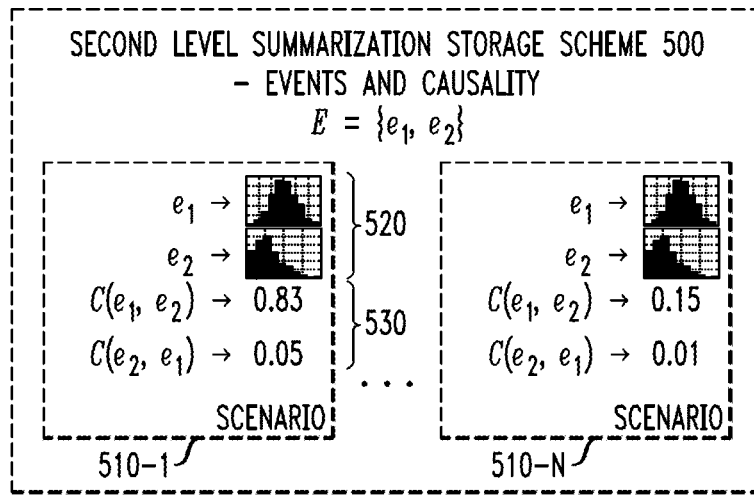
FIG. 5 illustrates an exemplary scheme for storing events and causality in an exemplary second summarization level, for each exemplary execution.

FIG. 5 illustrates an exemplary scheme 500 for storing events and causality in the exemplary second summarization level, for each exemplary execution 510-1 through 510-N.

For each event (e), a histogram 520 is computed for the number occurrences of the event in a single execution. For instance, suppose scenario #1 was executed 100 times. One possible histogram for event $e_1$ occurrence could be: {0 times in 10 executions, 10 times in 80 executions, 20 times in 10 executions}. Such a histogram is then transformed into a distribution probability for the number of occurrences of the event.

For causality (C)—for example, the frequency of True values in the causality annotations between two events $e_i$ and $e_j$ 530. This frequency corresponds to the percentage of True values among the executions that reported either a True or False value for causality.

When all the results from the multiple executions 510 of a scenario are summarized, computing probabilities for key attributes, events and causalities are persisted and the original data generated by the simulation application are optionally discarded.

Summarization Third Level:

After the simulation process is finished and there is one summary per scenario, the user can execute queries over the aggregated data.

It is noted that only queries that include attributes originally defined prior to the simulation execution in the sets X, A and K (by the Domain Expert) are allowed to be executed. This is important for the understanding of this approach: defining which data is important for analysis defines which aggregated data will be persisted to be subsequently used for queries. Therefore, for each query execution, a third level summarization occurs on-demand (e.g., in response to the user query).

For instance, let a certain simulation run with exploration attributes $x_1$ with range {1, 2, 3} and $x_2$ with range {10, 20, 30, 40, 50}; let also $k_1$ and $k_2$ be key temporal attributes. Suppose query Q1 is issued to show the distribution probability for $k_1$, with $x_1$ fixed to {1} but with $x_2$ considering any of the lower values {10, 20}. The query consults the stored summarizations of scenario (1, 10) and scenario (1, 20) and composes the corresponding distribution probabilities for k1. Such a composition can either assume equal probability for the scenarios or assume that they have specific probabilities provided by the user.

A query can also correspond to the computation of the distribution probability for the number of occurrences of a certain event when a subset of the possible scenarios is considered. In this case, the stored distribution probabilities of the corresponding scenarios are composed. This is done in the same way the distribution probabilities of key attributes are composed. Finally, a query can correspond to the probability of causality between events. In this case, there is a single probability value for the causality in each scenario to be considered. The values for each scenario are recovered and then composed. In both cases, computation can assume either equal probabilities for the scenarios or user-defined probabilities for each scenario.

Query Definition and Execution

When a User defines the key attributes K={$k_1$, $k_2$, . . . , $k_n$}, exploration attributes X={$x_1$, $x_2$, . . . , $x_m$} and aggregation attributes that he or she wants to consider in summarization, as well as events and causalities involving these attributes, the user is choosing the data that will be persisted, as well as how these data will be persisted; moreover, pre-computed aggregations will be stored to be used in queries.

Consider the overseas supply chain logistics example, where the exploration attributes are X={'fleet_size', 'ship_capacity'}. The user defines two key temporal attributes K={'port_occupation, 'lead_time'} (where the first one corresponds to the percentage of occupied docks in the port at each instant and the second one corresponds to the average lead time observed in the last 24 h), one single aggregation attribute A={'material_type'}, and two events:

$e_{port\_overload}$='port_occupation'>0.75;
$e_{delay}$='lead_time'>240

The user also wants to compute the causality between the two events:

$C(e_{port\_overload}, e_{delay})$.

The queries the user could perform, based on the previously defined attributes, are shown below, described in some hypothetical SQL-like examples, with a distinctive particularity: in relational databases, the WHERE/AND clauses define a predicate that returns a horizontal subset of the relation. However, since only distributed summaries are stored in one or more embodiments, the WHERE/AND clauses in these examples represent substantially exactly the third level summarizations among the different scenario summaries that were already previously created:

Query: distribution probability for the key attribute 'port occupation', restricting the range of values of 'fleet size' and 'ship capacity' explored on different scenarios, according to the domain of the exploration attributes:
SELECT get_distribution_probability('port_occupation')
FROM <simulation_run#N>
WHERE 'fleet_size' IN [20, 40]
AND 'ship_capacity' IN [500, 700]
Returns: one dataset corresponding to the aggregated distribution probability:
aggr(fleet_size=[20,40], ship_capacity=[500, 700])
Query: occurrences of defined events and causality, restricting the range of values of 'fleet size' and 'ship capacity':
SELECT get_distribution_probability('port_overload')
FROM <simulation_run#N>
WHERE 'fleet_size' IN [20]
AND 'ship_capacity' IN [500, 700]
Returns: one dataset for the case below:
aggr(fleet_size=[20], ship_capacity=[500, 700])
Query: histogram for the key attribute 'lead time', grouped by the 'material type' aggregation attribute, also restricting by the range of values of 'fleet size' and 'ship capacity':
SELECT 'material_type', get_distribution_probability ('lead_time')
FROM <simulation_run#N>
WHERE 'fleet_size' IN [20, 40]
GROUP BY 'material_type'
Returns: m datasets, where m is the number of distinct material types, for the case below:
aggr(fleet_size=[20,40], material_1)
aggr(fleet_size=[20,40], material_2)
. . .
aggr(fleet_size=[20,40], material_m)

Figure 6:
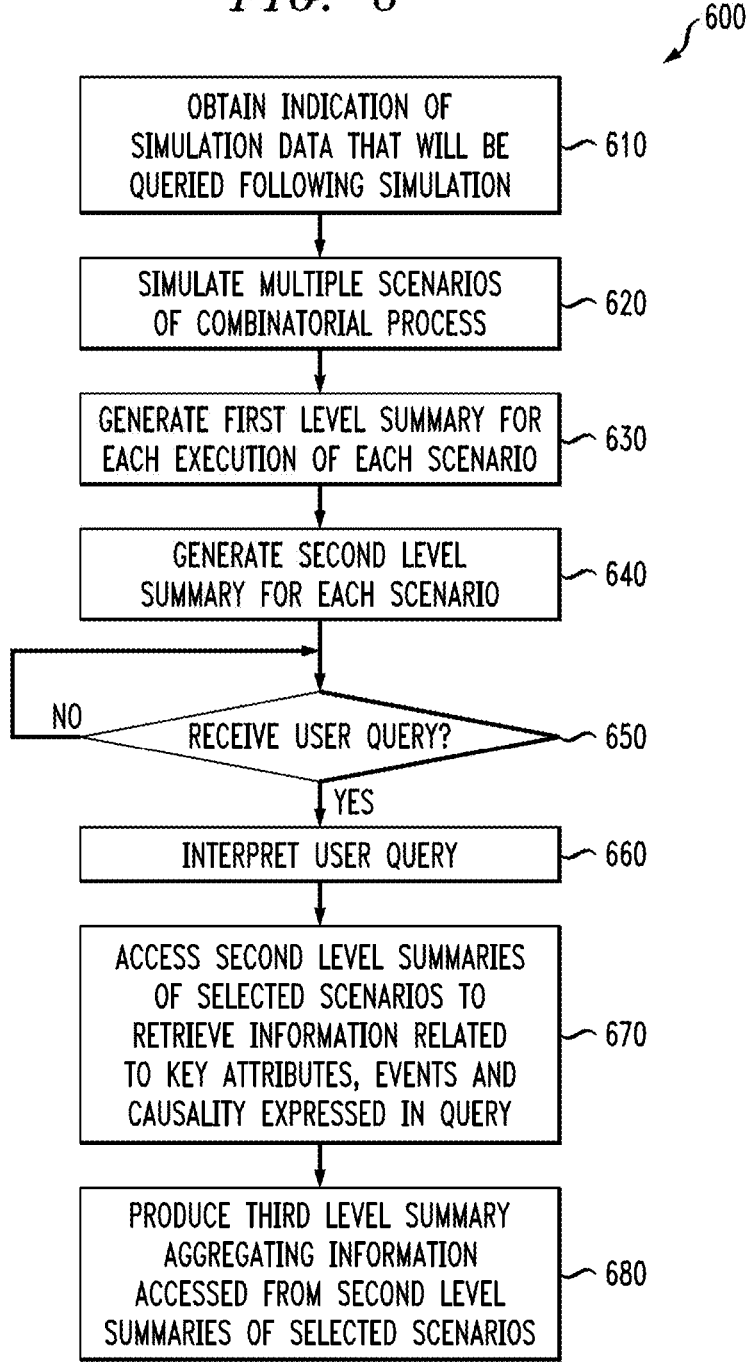
FIG. 6 is a flow chart illustrating an exemplary implementation of an exemplary simulation data summarization and query process according to one embodiment of the invention.

FIG. 6 is a flow chart illustrating an exemplary implementation of an exemplary simulation data summarization and query process 600 according to one embodiment of the invention. As shown in FIG. 6, the exemplary simulation data summarization and query process 600 initially obtains, during step 610, prior to an execution of a simulation of a combinatorial process, an indication of simulation data that will be queried following the simulation. As noted above, the simulation comprises a combination of exploration attributes comprising a plurality of independent variables that are varied during the simulation and key attributes of the combinatorial process that are a target of the simulation. The simulation data that will be queried comprises one or more of (i) a set of the key attributes, (ii) a set of events, and (iii) a set of causality relationships between a plurality of the events.

During step 620, the exemplary simulation data summarization and query process 600 simulates a plurality of scenarios of the combinatorial process. Each scenario corresponds to a distinct combination of the exploration attributes.

The exemplary simulation data summarization and query process 600 generates a first level summary during step 630 for each execution of each of the scenarios. Each first level summary comprises a summary of the key attributes indicating a frequency distribution of each attribute value in the key attributes, a timestamp of occurrences of each of the events, and/or an indication of whether the causality between the plurality of events has occurred during the simulation.

During step 640, the exemplary simulation data summarization and query process 600 generates a second level summary for each scenario. Each second level summary summarizes one or more executions of the given scenario and comprises a consolidated distribution probability for each of the key attributes, a frequency distribution of occurrences of each of the events in a single execution, and/or a frequency of occurrences of the causality between each pair of events.

A test is performed during step 650 to determine if a user query is received. The user query typically includes one or more ranges of exploration attributes that restricts the query to a specific set of selected scenarios to be considered and (i) the key attributes, (ii) the events, and/or (iii) the causality between a plurality of events.

Once it is determined during step 650 that a user query is received, then the user query is interpreted during step 660. Thereafter, the exemplary simulation data summarization and query process 600 accesses second level summaries of the selected scenarios during step 670 to retrieve the information related to the key attributes, events and causality expressed in the query.

Finally, the exemplary simulation data summarization and query process 600 produces as output a third level summary during step 680 that aggregates the information accessed from the second level summaries of the selected scenarios and contains (i) probability distribution functions of key attributes (ii) probability distribution functions of the number of occurrences of events, and/or (iii) composed probabilities of the causality relationships between events.

Query answers thus typically consist of probability distributions of key features, probabilities of critical events and probabilities of causality between events that may occur in datasets generated by the simulations.

Figure 7:
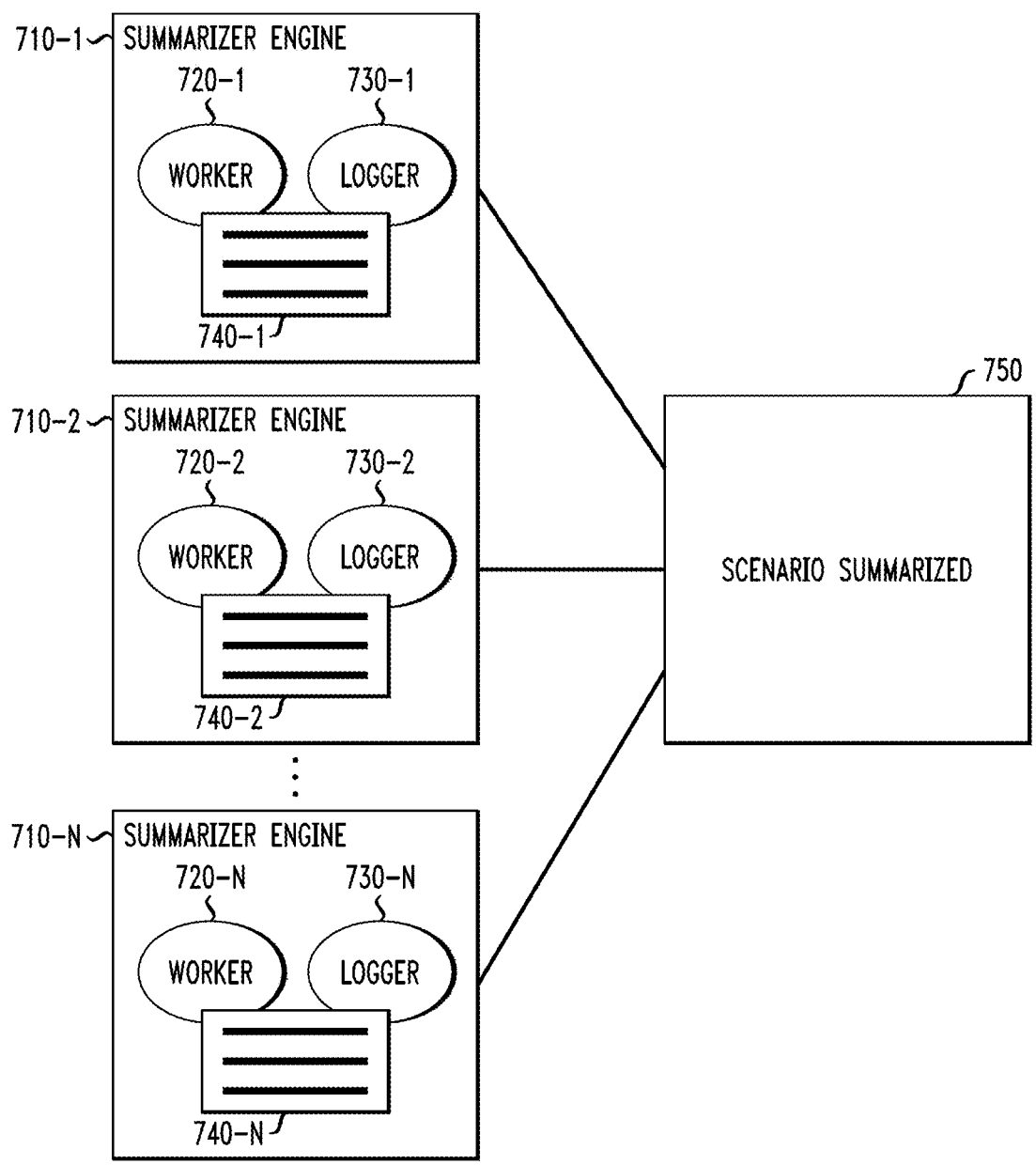
FIG. 7 illustrates an exemplary architecture for a summarizer according to one embodiment of the invention.

FIG. 7 illustrates an exemplary architecture for a summarizer 700 according to one embodiment of the invention. Generally, the summarizer 700 starts the simulation, by firing a predefined number of executions for each predefined scenario. The summarizer 700 is responsible for the overall task of reading all generated data, performing the summarizations at first and second level, and persisting the aggregated data, by calling the more specific components.

In one exemplary implementation, the summarizer 700 is an application running on a node in a computer cluster with several nodes, and it is the main orchestrator for the whole process. A user provides the exemplary summarizer 700 with four input parameters crucial to the summarization process:

A pointer to the location of the simulation application 740 and its configuration parameters;

The user-defined list of Attributes, events and Causalities;

A pointer to a location of an in-memory database where the second-level aggregation will occur;

List of addresses of cluster nodes as well as number of cores on each node that it can use to start the execution of Summarizer Engines.

As shown in FIG. 7, the exemplary summarizer 700 comprises a plurality of summarizer engines 710-1 through 710-N in a first stage for generating the first level summaries 300. In at least one embodiment, the summarizer 700 is programmed to assign a number of processors (or processor cores) in the cluster for each execution of each simulation, by starting a summarizer engine 710 for each of them on a designated core.

For each execution of each scenario, a summarizer engine 710 is created, encompassing the simulation application 740, a worker 720 and a logger 730. As shown in FIG. 7, several summarizer engines 710 can work in parallel. For example, if a scenario is set to run 100 times, the exemplary summarizer 700 will instantiate 100 instances of the summarizer engines 710 substantially simultaneously.

Each worker 720 reads the simulation data being generated by the simulation application 740 and converts the simulation data into a list of records ordered in time. The logger components 730 consume each record being generated by the worker 720 in order to perform the aggregation for the key attributes and to identify and count the events.

The logger 730 is the component responsible for the first level aggregation, discussed above. The output of the logger 730 is a set of ordered list of records, already aggregated by key attributes, for each execution of different scenarios. Thus, if 10 executions of 5 different scenarios are performed, this summarization happens 50 times.

In one exemplary implementation, each summarizer engine 710 starts a simulation execution on a designated cluster core, and it starts a pair instance of a worker 720 and a logger 730. During the simulation execution, the simulation application 740 generates a set of data frames in local memory. These data frames are specific to the simulation application.

In at least one embodiment, the worker object 720 reads all data frames generated by the simulation application on-the-fly, i.e., substantially as the data is being produced by the simulation. The worker object 720 performs programmable transformation rules to the read data, converting the information contained in the data frames into a single in-memory log. This single in-memory log should contain the needed data as previously determined by the set of all input Attributes and it is shared with the logger 730. The logger 730 is responsible for reading the log as it is being produced and aggregating the histograms at the same time the simulation is running.

When a single execution finishes, the worker 720 signals the logger 730 that the logger 730 can start to compute causality between events. When the logger 730 finishes its work, i.e., when aggregations and causalities are done, the logger 730 asks the summarizer engine 710 whether it can aggregate its computed data into the in-memory database. If the answer is yes, second level aggregation is performed, and the local shared memory is then discarded.

The second level summarization happens substantially as soon as the first level summarization is finished; in this step, all aggregated datasets that reside in separate summarizer engines 710 are reduced by aggregation into one single dataset per scenario, namely the scenario summarizer 750 generating distribution probabilities and probabilities of causality for each scenario, as discussed above.

The summarizer engine 710 collects all logger 730 requests for proceeding with the second level, allowing them to contact the in-memory database and dump their local summaries. Therefore, it can gauge whether one simulation execution is taking considerably longer than the others. In this case, it will choose an idle core to re-start this simulation. Whichever of both simulations finishes first will be allowed to proceed to second level aggregation. The other will be aborted—all work done by the Worker-Logger pair is discarded.

The scenario summarizer 750 is therefore responsible for accepting and aggregating all datasets generated from those summarization engines 710 of a single scenario. This newly aggregated dataset can be, for example, a file inside a Distributed File System or part of an in-memory database, and it is a task of the scenario summarizer 750 to persist the file. The scenario summarizer 750 optionally also provides an indexing scheme that will make aggregations easier.

In one or more embodiments, there exists one scenario summarizer 750 per scenario. As noted above, a scenario is one combination of values of Exploratory Attributes.

The exemplary query engine is responsible for:

Interpreting a query definition;

Selecting scenarios to use, for specific queries;

Aggregating the selected scenarios summaries, possibly considering user-defined probabilities for each scenario; and Producing the output datasets.

In one or more embodiments, interpreting a query means to extract, from a textual description:

The desired key attribute $k \in K$;

The subset of valid values $V_i \subseteq dom(x_i)$ for each Exploration Attributes $x_i \in X$ restricting the query; and The set of Aggregation Attributes $A' \subseteq A$.

Once the query engine knows $V = \{V_1, V_2, \ldots, V_n\}$, the query engine can check the scenarios that used the exploration attributes in V and select the correct scenarios summary instances that will be used in the third level aggregation.

With the correct scenarios summaries at hand, the query engine performs the third level summarization. In order to do that, the query engine searches all scenarios summaries for the keys that respect the attributes in A' and k. The query engine then aggregates the obtained values taking into account the probability of each scenario.

In at least one exemplary implementation, the query engine accepts user queries that specify a subset of simulated scenarios to be considered. The query engine decides which scenario files need to be loaded and aggregated, based on the exploration attributes. The query engine then aggregates these scenarios, possibly using a user-defined probability for each scenario. Distribution probabilities for key attributes or events or probabilities of causality are computed. Finally, the query engine exposes the final query results either as memory streams or as files persisted in a file system. It also caches the most recent loaded scenarios, to speed up further query responses.

In one or more exemplary implementations, an in-memory database runs on a core which is separate from all summarizer engines 710. Each logger 720 sends its aggregated data to the in-memory database, and it will perform the second level aggregation per scenario. Each scenario, i.e., combination of exploration attributes, is a key by which the in-memory database will aggregate the information sent by each logger 730 in a scenario dataset. This key is used for indexing, in order to speed up the aggregation process. Each scenario dataset will be persisted as a file that can be chosen among common formats, provided the implementation of the query engine can read this format. For instance, the scenario datasets could be written in JSON text files or in a proprietary format that the in-memory database can read.

Example

Consider a use case related to oil and gas platforms supply logistics. A simplification of the logistics process follows:
  Platforms request needed materials to Controller Offices;
  Controller Offices generate Material Orders and send these orders to Warehouses;
  Warehouses process and pack these materials in Containers that can vary by size and send them by terrestrial transport to designated Ports;
  When Containers arrive in designated Ports, they are queued according to the urgency of the materials they contain;
  Containers are placed in Ships, by taking into consideration the Ship schedules;
  Ships deliver materials to their Destination Platform according to their routes and return to Ports.

It is a given fact that software to simulate such process would model the important entities above mentioned, such as Order, Warehouse, Port, Fleet, Container and Platform. Moreover, the simulation software defines the lists of all values that each entity may assume at a specific time; these lists of values are referred to as the domain of these entities.

During the simulation process, the software records, at each time instant, information about these and all other relevant entities that take part in the simulation, and generates frames of data for each of them.

Assume a user wants to run a simulation to predict whether reducing the fleet size will incur on bottlenecks in ports. Currently, the fleet comprises 50 ships scattered among 10 ports, and the user wants to get an idea on how badly bottlenecks on ports start to show up should the fleet size be reduced by 10 ships. In this case, a bottleneck needs to be defined as an event. For instance, let's say a bottleneck occurs when any port is at its maximum capacity for more than two days. Assume that a port reaches its maximum capacity at 1000 containers. The user also wants to determine which destination platforms will suffer the effect of bottlenecks the most.

In this case, the input to the system before the simulation process starts will be the following:
  Key element attribute: lead_time;
  Aggregate Attribute: destination_platform; and
  Exploratory Attribute: fleet_size.

The bottleneck event would be defined as follows:
  e ("bottleneck")=$\Lambda_0^{48}$(number_containers_in_port>1000).

Once the simulation is finished, the needed summarizations that allow for this query to be performed are already done and the original data frames can be discarded. On a hypothetical SQL-like construct, the queries will look like the following example:
  SELECT get_distribution_probability(e('bottleneck'))
  FROM <simulation_run#N>
  WHERE 'fleet size' IN [40]

The result of the query will be a distribution probability for the occurrence of a bottleneck at the port. If the user wants to investigate further the consequences of the bottleneck, the user may evaluate the probability distribution of lead times per destination with the following query:
  SELECT 'destination_platform', get_distribution_probability('lead_time'),
  FROM <simulation_run#N>
  WHERE 'fleet size' IN [40]
  GROUP BY 'destination_platform'

The result of the query will be a distribution probability of the lead time for each destination_platform. Based on the answers, the user can analyze to what extent the reduction of the number of ships influences the probability of bottlenecks and which destinations are more affected by this reduction.

Conclusion

Among other benefits, aspects of the present invention summarize and query data generated by data-intensive simulations. Simulation of complex systems usually generate large amounts of data that need to be managed and analyzed in order to efficiently answer queries related to multiple different simulation scenarios. In one or more embodiments, a data summarization method for Discrete-time Simulation applications is provided in which a large number of scenarios are simulated and queries related to probabilities are executed. Simulation results are summarized substantially on-the-fly in order to save storage and improve subsequent query response times. Queries to be answered comprise distribution probabilities of key features, probabilities of critical events and probabilities of causality between events. In addition, these queries specify the set of scenarios that should be considered when probabilities are computed. Such a set can be any subset of the simulated scenarios. One challenge is the summarization of results in such a way that they can be accurately and efficiently combined to answer the queries. In one or more embodiments, summaries are computed substantially in parallel with the simulations using both local and remote memory resources. Summaries contain only the desirable amount of information for answering the possible future queries and are structured to allow for an efficient computation of the probabilities.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the exemplary computing environment. Such components can communicate with other elements of the system over any type of network or other communication media.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 8:
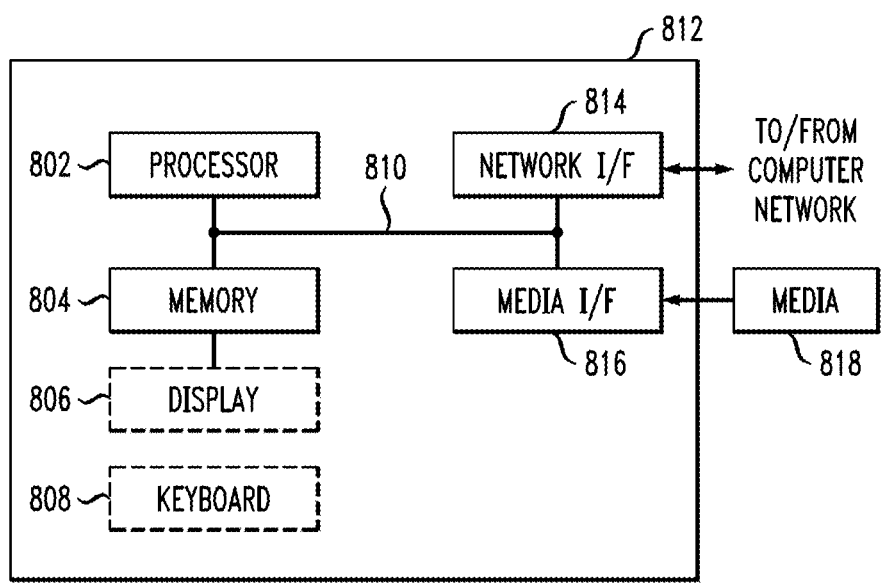
FIG. 8 is a system diagram of an exemplary computer system on which at least one embodiment of the invention can be implemented.

By way of example, an aspect of the present invention can make use of software running on a general purpose computer. FIG. 8 is a system diagram of an exemplary computer system on which at least one embodiment of the invention can be implemented. As depicted in FIG. 8, an example implementation employs, for example, a processor 802, a memory 804, and an input/output interface formed, for example, by a display 806 and a keyboard 808. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 802, memory 804, and input/output interface such as display 806 and keyboard 808 can be interconnected, for example, via bus 810 as part of a data processing unit 812. Suitable interconnections via bus 810, can also be provided to a network interface 814 (such as a network card), which can be provided to interface with a computer network, and to a media interface 816 (such as a diskette or compact disc read-only memory (CD-ROM) drive), which can be provided to interface with media 818.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 808, displays 806, and pointing devices, can be coupled to the system either directly (such as via bus 810) or through intervening I/O controllers.

Network adapters such as network interface 814 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 812 as depicted in FIG. 8) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved summarization and querying of simulation data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:

obtaining a first level summary for each execution of a simulation of a plurality of scenarios of a combinatorial process, wherein each of said plurality of scenarios corresponds to a distinct combination of exploration attributes, wherein said simulation comprises a combination of said exploration attributes comprising a plurality of independent variables that are varied during said simulation and key attributes of said combinatorial process that are a target of said simulation, and wherein a user has provided, prior to a time of the simulation, an indication of simulation data that will be queried following said simulation, wherein said simulation data that will be queried comprises one or more of (i) a set of said key attributes, (ii) a set of events, and (iii) a set of causality relationships between a plurality of said events, wherein each of said first level summaries comprise one or more of (i) a summary of said key attributes indicating a frequency distribution of each attribute value in the one or more of said key attributes, (ii) a timestamp of occurrences of each of said events, and (iii) an indication of whether said causality between said plurality of said events is observed during said simulation;

obtaining a second level summary for each of said scenarios, wherein each of said second level summaries summarizes one or more executions of said given scenario and comprises one or more of (i) a consolidated distribution probability for each of said key attributes based on an aggregation of the frequency distribution of each attribute value in the first level summaries, (ii) a frequency distribution of occurrences of each of said events in a single execution based on the timestamp of occurrences over time from the first level summaries, and (iii) a frequency of observations of the causality between each pair of said events based on the indication of whether said causality between said plurality of said events is observed during said simulation from the first level summaries, wherein the first level summary and the second level summary comprise less data than a source data for each of the executions of the simulation of the plurality of scenarios of the combinatorial process and wherein the source data generated by each of the executions of the simulation of the plurality of scenarios of the combinatorial process used to generate one or more of the first level summary and the second level summary is discarded, by sending an instruction to at least one memory device that stores the source data, responsive to at least one of the first level summary and the second level summary being generated; and in response to a user query that includes one or more ranges of exploration attributes that restrict the user query to a specific set of selected scenarios to be considered, based on said indication of said simulation data that will be queried following said simulation, and one or more of (i) said key attributes, (ii) said events, and (iii) said causality between a plurality of said events, performing the following steps:

interpreting said user query;

accessing second level summaries, without accessing the source data, of said selected scenarios to retrieve the information related to said key attributes, events and causality expressed in the query; and producing as a query response output a third level summary that aggregates the information accessed from said second level summaries of said selected scenarios and contains one or more of (i) probability distribution functions of said key attributes, (ii) probability distribution functions of the number of occurrences of said events, and (iii) composed probabilities of the causality relationships between said events, wherein the method is performed by at least one processing device comprising a processor coupled to a second memory.

2. The method of claim 1, wherein said first level summary and said second level summary are generated during said simulation, and wherein said second level summaries are subsequently used to generate said third level summaries in response to one or more of said user queries.

3. The method of claim 1, wherein said simulation data that will be queried further comprises one or more hierarchies of one or more aggregation attributes that group one or more of said key attributes at all summarization levels.

4. The method of claim 3, further comprising the step of storing sub-totals of said key attributes for each level of said hierarchy of aggregation attributes.

5. The method of claim 1, wherein said key attributes comprise one or more key element attributes representing attributes of the elements processed by said simulation and one or more key temporal attributes representing properties assigned to a time instant of said simulation.

6. The method of claim 3, wherein said step of interpreting said user query further comprises extracting one or more of (i) desired key attributes, (ii) a subset of valid values or intervals for each of said exploration attributes, and (iii) a subset of valid values or intervals for each of said aggregation attributes as defined by the user query.

7. Method of claim 6, wherein said step of interpreting said user query further comprises extracting one or more of (ii) the subset of valid values or intervals for each of said exploration attributes, and (iii) the subset of valid values or intervals for each of said aggregation attributes as defined by the user query and wherein said step of accessing second level summaries of said selected scenarios to retrieve the information is based on said subset of valid values or intervals.

8. The method of claim 1, wherein said simulation occurs in parallel among one or more compute nodes on a distributed computing infrastructure, and wherein each one of the first level summary, the second level summary and the third level summary are generated in parallel among one or more compute nodes of said distributed computing infrastructure.

9. The method of claim 1, wherein said first level summaries and second level summaries are computed using volatile in-memory storage and subsequently persisted in non-volatile disk storage for future use.

10. A computer program product, comprising a non-transitory machine-readable storage medium having encoded therein executable code of one or more software programs, wherein the one or more software programs when executed by at least one processing device perform the following steps:

obtaining a first level summary for each execution of a simulation of a plurality of scenarios of a combinatorial process, wherein each of said plurality of scenarios corresponds to a distinct combination of exploration attributes, wherein said simulation comprises a combination of said exploration attributes comprising a plurality of independent variables that are varied during said simulation and key attributes of said combinatorial process that are a target of said simulation, and wherein a user has provided, prior to a time of the simulation, an indication of simulation data that will be queried following said simulation, wherein said simulation data that will be queried comprises one or more of (i) a set of said key attributes, (ii) a set of events, and (iii) a set of causality relationships between a plurality of said events, wherein each of said first level summaries comprise one or more of (i) a summary of said key attributes indicating a frequency distribution of each attribute value in the one or more of said key attributes, (ii) a timestamp of occurrences of each of said events, and (iii) an indication of whether said causality between said plurality of said events is observed during said simulation;

obtaining a second level summary for each of said scenarios, wherein each of said second level summaries summarizes one or more executions of said given scenario and comprises one or more of (i) a consolidated distribution probability for each of said key attributes based on an aggregation of the frequency distribution of each attribute value in the first level summaries, (ii) a frequency distribution of occurrences of each of said events in a single execution based on the timestamp of occurrences over time from the first level summaries, and (iii) a frequency of observations of the causality between each pair of said events based on the indication of whether said causality between said plurality of said events is observed during said simulation from the first level summaries, wherein the first level summary and the second level summary comprise less data than a source data for each of the executions of the simulation of the plurality of scenarios of the combinatorial process and wherein the source data generated by each of the executions of the simulation of the plurality of scenarios of the combinatorial process used to generate one or more of the first level summary and the second level summary is discarded, by sending an instruction to at least one memory device that stores the source data, responsive to at least one of the first level summary and the second level summary being generated; and in response to a user query that includes one or more ranges of exploration attributes that restrict the user query to a specific set of selected scenarios to be considered, based on said indication of said simulation data that will be queried following said simulation, and one or more of (i) said key attributes, (ii) said events, and (iii) said causality between a plurality of said events, performing the following steps:

interpreting said user query;

accessing second level summaries, without accessing the source data, of said selected scenarios to retrieve the information related to said key attributes, events and causality expressed in the query; and producing as a query response output a third level summary that aggregates the information accessed from said second level summaries of said selected scenarios and contains one or more of (i) probability distribution functions of said key attributes, (ii) probability distribution functions of the number of occurrences of said events, and (iii) composed probabilities of the causality relationships between said events.

11. The computer program product of claim 10, wherein said first level summary and said second level summary are generated during said simulation and wherein said second level summaries are subsequently used to generate said third level summaries in response to one or more of said user queries.

12. The computer program product of claim 10, wherein said simulation data that will be queried further comprises one or more hierarchies of one or more aggregation attributes that group one or more of said key attributes at all summarization levels.

13. The computer program product of claim 12, wherein said step of interpreting said user query further comprises extracting one or more of (i) desired key attributes, (ii) a subset of valid values or intervals for each of said exploration attributes, and (iii) a subset of valid values or intervals for each of said aggregation attributes as defined by the user query.

14. The computer program product of claim 13, wherein said step of interpreting said user query further comprises extracting one or more of (ii) the subset of valid values or intervals for each of said exploration attributes, and (iii) the subset of valid values or intervals for each of said aggregation attributes as defined by the user query and wherein said step of accessing second level summaries of said selected scenarios to retrieve the information is based on said subset of valid values or intervals.

15. A system, comprising:
a first memory; and
at least one processing device, coupled to the memory, operative to implement the following steps:
obtaining a first level summary for each execution of a simulation of a plurality of scenarios of a combinatorial process, wherein each of said plurality of scenarios corresponds to a distinct combination of exploration attributes, wherein said simulation comprises a combination of said exploration attributes comprising a plurality of independent variables that are varied during said simulation and key attributes of said combinatorial process that are a target of said simulation, and wherein a user has provided, prior to a time of the simulation, an indication of simulation data that will be queried following said simulation, wherein said simulation data that will be queried comprises one or more of (i) a set of said key attributes, (ii) a set of events, and (iii) a set of causality relationships between a plurality of said events, wherein each of said first level summaries comprise one or more of (i) a summary of said key attributes indicating a frequency distribution of each attribute value in the one or more of said key attributes, (ii) a timestamp of occurrences of each of said events, and (iii) an indication of whether said causality between said plurality of said events is observed during said simulation;
obtaining a second level summary for each of said scenarios, wherein each of said second level summaries summarizes one or more executions of said given scenario and comprises one or more of (i) a consolidated distribution probability for each of said key attributes based on an aggregation of the frequency distribution of each attribute value in the first level summaries, (ii) a frequency distribution of occurrences of each of said events in a single execution based on the timestamp of occurrences over time from the first level summaries, and (iii) a frequency of observations of the causality between each pair of said events based on the indication of whether said causality between said plurality of said events is observed during said simulation from the first level summaries, wherein the first level summary and the second level summary comprise less data than a source data for each of the executions of the simulation of the plurality of scenarios of the combinatorial process and wherein the source data generated by each of the executions of the simulation of the plurality of scenarios of the combinatorial process used to generate one or more of the first level summary and the second level summary is discarded, by sending an instruction to at least one second memory device that stores the source data, responsive to at least one of the first level summary and the second level summary being generated; and in response to a user query that includes one or more ranges of exploration attributes that restrict the user query to a specific set of selected scenarios to be considered, based on said indication of said simulation data that will be queried following said simulation, and one or more of (i) said key attributes, (ii) said events, and (iii) said causality between a plurality of said events, performing the following steps:

interpreting said user query;

accessing second level summaries, without accessing the source data, of said selected scenarios to retrieve the information related to said key attributes, events and causality expressed in the query; and producing as a query response output a third level summary that aggregates the information accessed from said second level summaries of said selected scenarios and contains one or more of (i) probability distribution functions of said key attributes, (ii) probability distribution functions of the number of occurrences of said events, and (iii) composed probabilities of the causality relationships between said events.

16. The system of claim 15, wherein said first level summary and said second level summary are generated during said simulation and wherein said second level summaries are subsequently used to generate said third level summaries in response to one or more of said user queries.

17. The system of claim 15, wherein said simulation data that will be queried further comprises one or more hierarchies of one or more aggregation attributes that group one or more of said key attributes at all summarization levels.

18. The system of claim 17, wherein said step of interpreting said user query further comprises extracting one or more of (i) desired key attributes, (ii) a subset of valid values or intervals for each of said exploration attributes, and (iii) a subset of valid values or intervals for each of said aggregation attributes as defined by the user query.

19. The system of claim 15, wherein said simulation occurs in parallel among one or more compute nodes on a distributed computing infrastructure, and wherein each one of the first level summary, the second level summary and the third level summary are generated in parallel among one or more compute nodes of said distributed computing infrastructure.

20. The system of claim 15, wherein said first level summaries and second level summaries are computed using volatile in-memory storage and subsequently persisted in non-volatile disk storage for future use.

\* \* \* \* \*